US012632294B2

(12) United States Patent
Zhang et al.

(10) Patent No.: US 12,632,294 B2
(45) Date of Patent: May 19, 2026

(54) SERVICE SCHEDULING USING STATIC AND DYNAMIC SERVICE AFFINITIES

(71) Applicant: INTERNATIONAL BUSINESS MACHINES CORPORATION, Armonk, NY (US)

(72) Inventors: Xi Qing Zhang, Beijing (CN); Xing Xing Shen, Beijing (CN); Shao Fei Li, Beijing (CN); Ji Dong Li, Beijing (CN); Peng Hui Jiang, Beijing (CN); Jia Tian Zhong, Beijing (CN); Jia Yu, Beijing (CN); Dong Hui Liu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 429 days.

(21) Appl. No.: 18/321,369

(22) Filed: May 22, 2023

(65) Prior Publication Data

US 2024/0394094 A1 Nov. 28, 2024

(51) Int. Cl.
*G06F 9/48* (2006.01)

(52) U.S. Cl.
CPC .................................. *G06F 9/4881* (2013.01)

(58) Field of Classification Search
None
See application file for complete search history.

(56) References Cited

U.S. PATENT DOCUMENTS 7,464,147 B1 * 12/2008 Fakhouri ................ G06Q 10/04
                                                           709/223

| | | | | |
|---|---|---|---|---|
| 8,205,208 B2 * | 6/2012 | Mausolf | ................ | G06F 9/4881 |
| | | | | 709/201 |
| 8,276,164 B2 * | 9/2012 | Munshi | ................. | G06F 9/5044 |
| | | | | 718/104 |
| 8,904,005 B2 * | 12/2014 | Ferris | .................... | G06F 9/5072 |
| | | | | 709/226 |
| 8,959,526 B2 * | 2/2015 | Kansal | .................. | G06F 9/5077 |
| | | | | 718/1 |
| 9,983,860 B1 * | 5/2018 | Koty | ....................... | H04L 67/10 |
| 10,268,509 B2 * | 4/2019 | Chen | ..................... | G06F 9/5061 |

(Continued)

FOREIGN PATENT DOCUMENTS

CN 110515716 11/2021

OTHER PUBLICATIONS

Saxena, et al., "Workload Forecasting and Resource Management Models Based on Machine Learning for Cloud Computing Environments." Published Jun. 29, 2021 by ARXIV. 17 pages. arXiv:2106. 15112v1.

*Primary Examiner* — Van H Nguyen
(74) *Attorney, Agent, or Firm* — Seed Intellectual Property Law Group LLP

(57) ABSTRACT

A computer-implemented method, a system, and a computer program product for service delivery are disclosed. In the method, a static analysis can be performed on a plurality of services to be deployed in an environment comprising a plurality of nodes, to determine dependency relationships among the plurality of services. The plurality of services can be deployed in the environment based on the dependency relationships, a predefined priority for each of the plurality of services, and deployment time for each of the plurality of services. Also, the plurality of services can be scheduled into corresponding nodes in the environment.

20 Claims, 13 Drawing Sheets

1100

PERFORM A STATIC ANALYSIS ON A PLURALITY OF SERVICES TO BE DEPLOYED IN AN ENVIRONMENT COMPRISING A PLURALITY OF NODES, TO DETERMINE DEPENDENCY RELATIONSHIPS AMONG THE PLURALITY OF SERVICES
1110

DEPLOY THE PLURALITY OF SERVICES IN THE ENVIRONMENT BASED ON THE DEPENDENCY RELATIONSHIPS, A PREDEFINED PRIORITY FOR EACH OF THE PLURALITY OF SERVICES AND DEPLOYMENT TIME FOR EACH OF THE PLURALITY OF SERVICES
1120

SCHEDULE RESPECTIVE SERVICES INTO CORRESPONDING NODES IN THE ENVIRONMENT
1130

(56)  References Cited

U.S. PATENT DOCUMENTS

| | | | |
|---|---|---|---|
| 11,061,740 B2 * | 7/2021 | Orth ...................... | G06F 9/4843 |
| 11,218,546 B2 * | 1/2022 | Spoczynski ......... | H04L 41/0895 |
| 11,307,901 B2 | 4/2022 | Chen | |
| 11,394,770 B1 | 7/2022 | Bello | |
| 11,637,905 B2 * | 4/2023 | Shen ....................... | H04L 67/10 |
| | | | 709/201 |
| 11,824,949 B2 * | 11/2023 | Gilat ....................... | H04L 67/51 |
| 2012/0131193 A1 * | 5/2012 | Ferris ................... | G06F 9/5072 |
| | | | 709/226 |
| 2019/0319844 A1 * | 10/2019 | Ding ................. | H04L 41/5058 |
| 2020/0218579 A1 | 7/2020 | D M | |
| 2021/0385288 A1 * | 12/2021 | Shen ...................... | H04L 67/10 |
| 2022/0237034 A1 | 7/2022 | Chen | |
| 2022/0353343 A1 * | 11/2022 | Gilat ....................... | H04L 41/12 |

* cited by examiner

Figure 1:
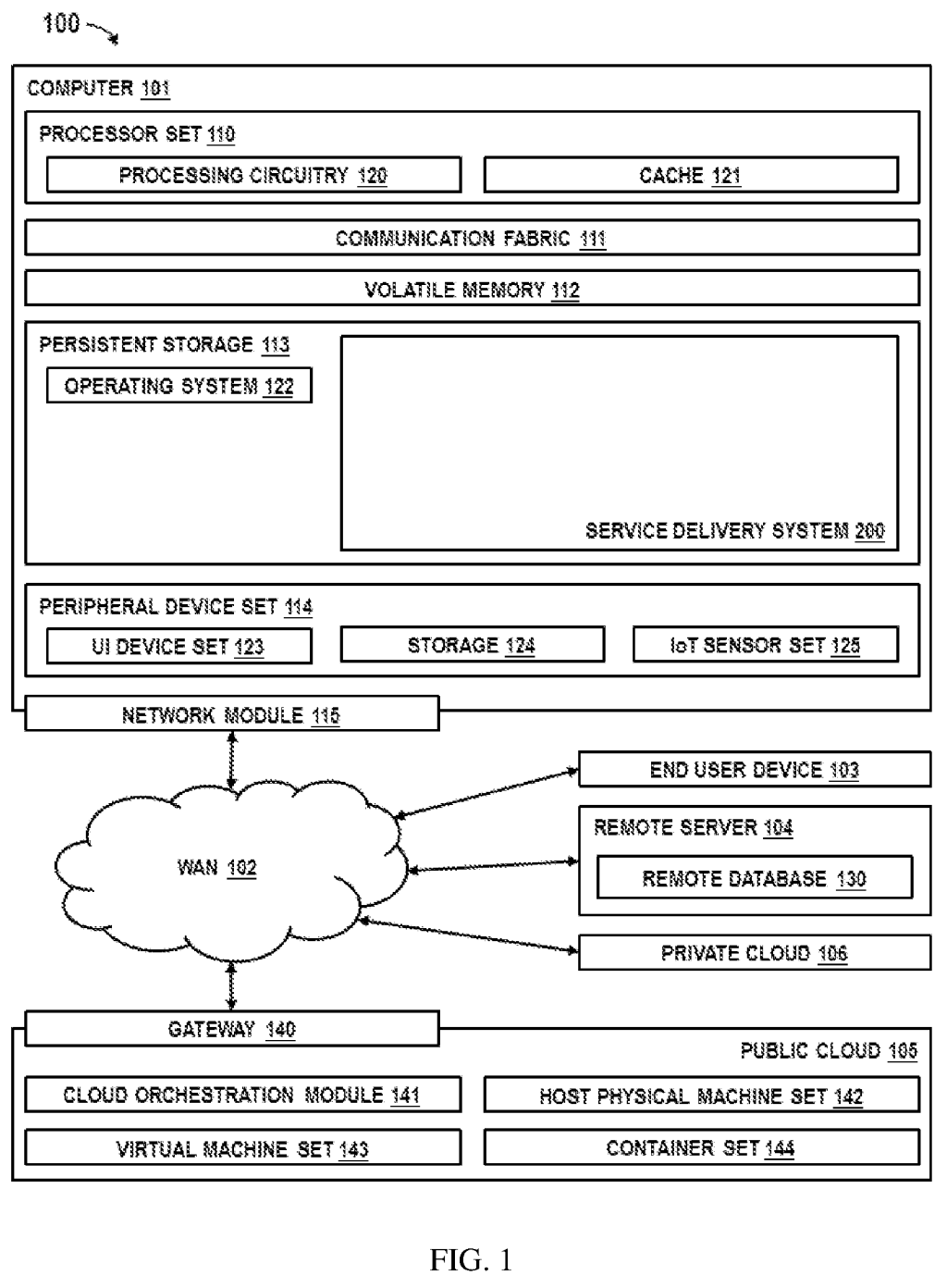

100

COMPUTER 101

PROCESSOR SET 110

| PROCESSING CIRCUITRY 120 | CACHE 121 |

COMMUNICATION FABRIC 111

VOLATILE MEMORY 112

PERSISTENT STORAGE 113

OPERATING SYSTEM 122

SERVICE DELIVERY SYSTEM 200

PERIPHERAL DEVICE SET 114

| UI DEVICE SET 123 | STORAGE 124 | IoT SENSOR SET 125 |

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

| CLOUD ORCHESTRATION MODULE 141 | HOST PHYSICAL MACHINE SET 142 |
| VIRTUAL MACHINE SET 143 | CONTAINER SET 144 |

SERVICE 530

SERVICE 540

600

700

METRICS FOR SERVICES TO BE SCHEDULED

—— S1  - - - S2

METRICS FOR SERVICE ON CANDIDATE NODE

········ S3

1000

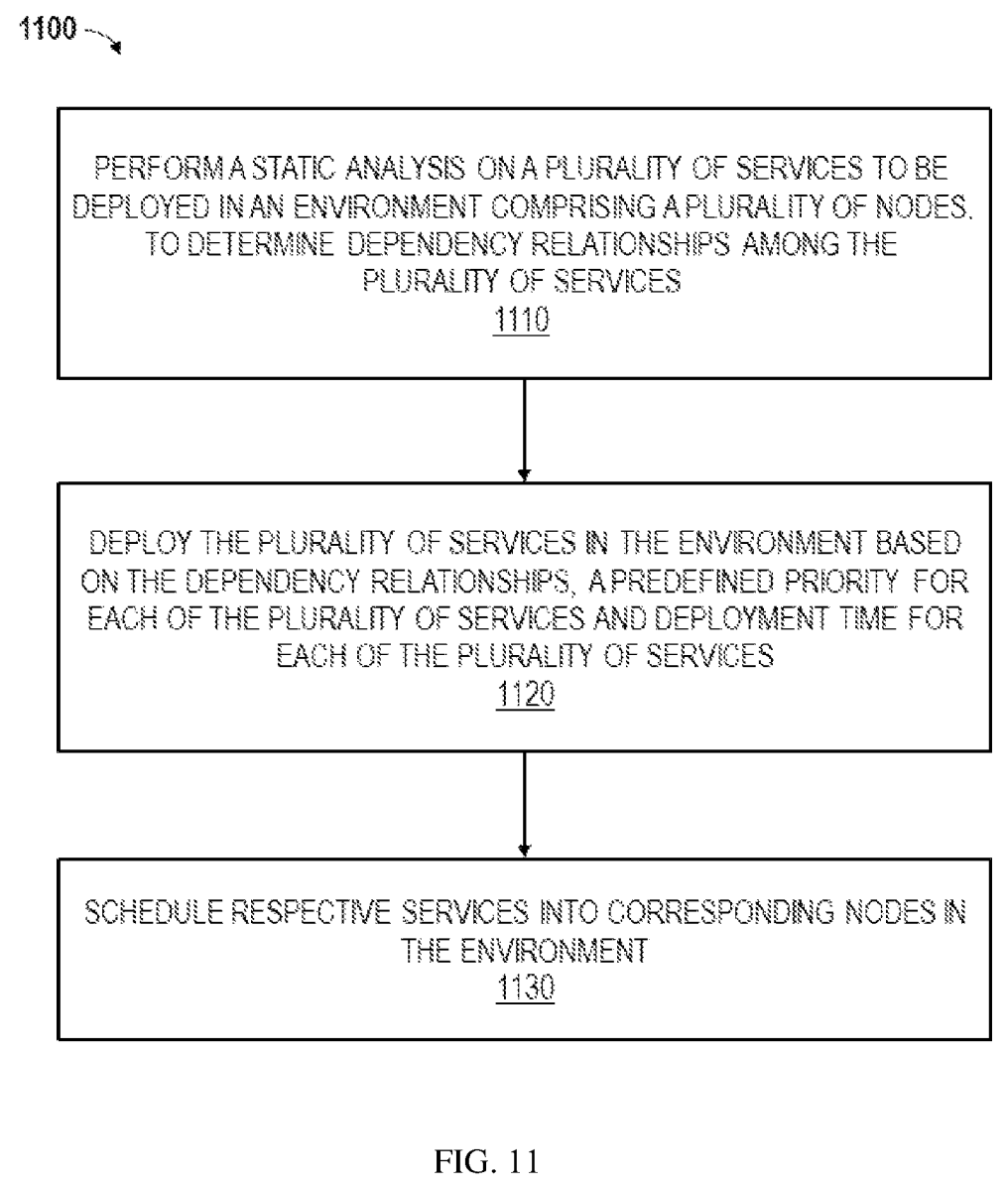

1100 ⇂

PERFORM A STATIC ANALYSIS ON A PLURALITY OF SERVICES TO BE DEPLOYED IN AN ENVIRONMENT COMPRISING A PLURALITY OF NODES, TO DETERMINE DEPENDENCY RELATIONSHIPS AMONG THE PLURALITY OF SERVICES
1110

DEPLOY THE PLURALITY OF SERVICES IN THE ENVIRONMENT BASED ON THE DEPENDENCY RELATIONSHIPS, A PREDEFINED PRIORITY FOR EACH OF THE PLURALITY OF SERVICES AND DEPLOYMENT TIME FOR EACH OF THE PLURALITY OF SERVICES
1120

SCHEDULE RESPECTIVE SERVICES INTO CORRESPONDING NODES IN THE ENVIRONMENT
1130

FIG. 11

SERVICE SCHEDULING USING STATIC AND DYNAMIC SERVICE AFFINITIES

BACKGROUND

The present invention relates to service delivery, and more specifically, to service delivery based on dependency relationships and priorities.

Generally, service delivery is when a service provider offers users access to services, such as, cloud services or on-premises applications. As a number of services increases, the service delivery may be time-consuming and error prone. It may involve multiple phases, such as a development phase, a staging phase, and/or a production phase. It may take a few days, or even months, to roll out the services from the staging phase to the production phase as the services are usually deployed sequentially. Moreover, unbalanced scheduling of services may cause waste of resources and frequent node switching.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

According to one embodiment of the present disclosure, there is provided a computer-implemented method for service delivery. In the method, a static analysis can be performed on services to be deployed in an environment comprising nodes, to determine dependency relationships among the services. The services can be deployed in the environment based on the dependency relationships, a predefined priority for each of the services and deployment time for each of the services. Then, the services can be scheduled into corresponding nodes in the environment.

Therefore, a delivery efficiency of the services can be improved greatly. A deployment failure of the services due to ignoring the dependency relationships can be avoided.

In some embodiments, the deploying of the services can comprise: calculating a respective score for a respective service in the services, wherein the respective score is obtained based on a respective predefined priority for the respective service, a dependency factor for the respective service, and scores of other services depending on the respective service, wherein the dependency factor is based on the dependency relationships; and deploying the services based on the calculated respective scores and deployment time for each of the services. Therefore, the service with higher business priority and/or more dependents can be deployed with higher priority.

In some embodiments, a dynamic analysis can be performed on a service in the services to determine a dynamic service affinity of the service based on resource usage data associated with the service in one or more environment. The service can be scheduled based on the dynamic service affinity of the service and a node affinity of a respective node in the nodes. Therefore, the method may provide an efficient scheduling process, thereby saving system's effort to reschedule the services among nodes due to shortage of system resource.

In some embodiments, the static analysis can be performed to further determine a static service affinity of the service. The service can be scheduled further based on the static service affinity of the service. Therefore, the service can be scheduled more efficiently.

In some embodiments, the performing of the dynamic analysis can comprise the following steps. A group of resource usage metrics associated with the service per environment can be determined from resource usage data associated with the service in at least one environment. A weight can be set to the group of resource usage metrics associated with the service per environment based on the resource usage data. A weighted average of each resource usage metric in the group of resource usage metrics associated with the service in the at least one environment can be calculated. The above determining, setting, and calculating steps can be repeated for predetermined times. An average of each resource usage metric associated with the service in the predetermined times can be obtained. The dynamic service affinity of the service can be obtained based on the average of each resource usage metric associated with the service in the predetermined times. Therefore, the weight set to the group of resource usage metrics per environment may be adjusted dynamically, such that the dynamic service affinity of the service can be obtained more accurately.

In some embodiments, a presentation associated with the average of each resource usage metric associated with the service in the predetermined times can be generated. Sample presentations can be retrieved, each being associated with a sample service. The dynamic service affinity can be obtained by matching the generated presentation with the sample presentations. Therefore, a visualization can be utilized for improving the scheduling efficiency.

In some embodiments, the scheduling of the respective services can comprise: obtaining first resource usage data associated with one or more services to be scheduled; determining a candidate node in the nodes based on the node affinity of the respective node; receiving second resource usage data associated with all running services on the candidate node; combining the first resource usage data and the second resource usage data to determine a combined result. In response to the combined result meeting certain rules, the one or more services to be scheduled can be scheduled into the candidate node. Therefore, the combined result may indicate whether the candidate node is suitable for the service scheduling before the service is actually scheduled in the candidate node, thereby improving the scheduling efficiency of the service.

In some embodiments, the first resource usage data can comprise one or more groups of resource usage metrics associated with the one or more services to be scheduled. The second resource usage data can comprise one or more groups of resource usage metrics associated with the running services on the candidate node. The combining can comprise: generating a combined presentation associated with a group of combined metrics by combining the one or more groups of resource usage metrics associated with the one or more services to be scheduled with the one or more groups of resource usage metrics associated with the running services on the candidate node; and determining whether the combined presentation meets certain graphic rules. Therefore, a visualization can be utilized to provide the combined result, thereby improving the scheduling efficiency and accuracy of the service.

In some embodiments, two or more services without inter-dependency can be deployed in parallel. Therefore, a delivery efficiency of the services can also be improved greatly.

According to another embodiment of the present disclosure, there is provided a system for service delivery. The system may comprise one or more processors, a memory coupled to at least one of the one or more processors, and a set of computer program instructions stored in the memory. The set of computer program instructions may be executed by at least one of one or more processors to perform the above methods.

According to another embodiment of the present disclosure, there is provided a computer program product for service delivery. The computer program product may comprise a computer readable storage medium having program instructions embodied therewith. The program instructions executable by one or more processors causes the one or more processors to perform the above methods.

Therefore, services can be deployed based on their dependency relationships and business priorities. A deployment failure of services with missing dependency relationships can be avoided. The service with a higher business priority and more dependents can be deployed first. Multiple services without inter-dependency relationship can be deployed in parallel. Thus, a delivery efficiency of the services can also be improved greatly. A new version of services can be provided as early as possible.

Moreover, services can be scheduled based on node affinity and their own service affinity during launch, thereby improving system resource utilization. Meanwhile, the efficient scheduling process may save system's effort to reschedule the services among nodes due to the shortage of system resources.

In addition to the exemplary aspects and embodiments described above, further aspects and embodiments will become apparent by reference to the drawings and by study of the following descriptions.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

FIG. 1 shows an exemplary computing environment which is applicable to implement the embodiments of the present disclosure;

FIG. 11 shows a flowchart illustrating an exemplary method for service delivery according to some embodiments of the present disclosure.

DETAILED DESCRIPTION

Figure 2:
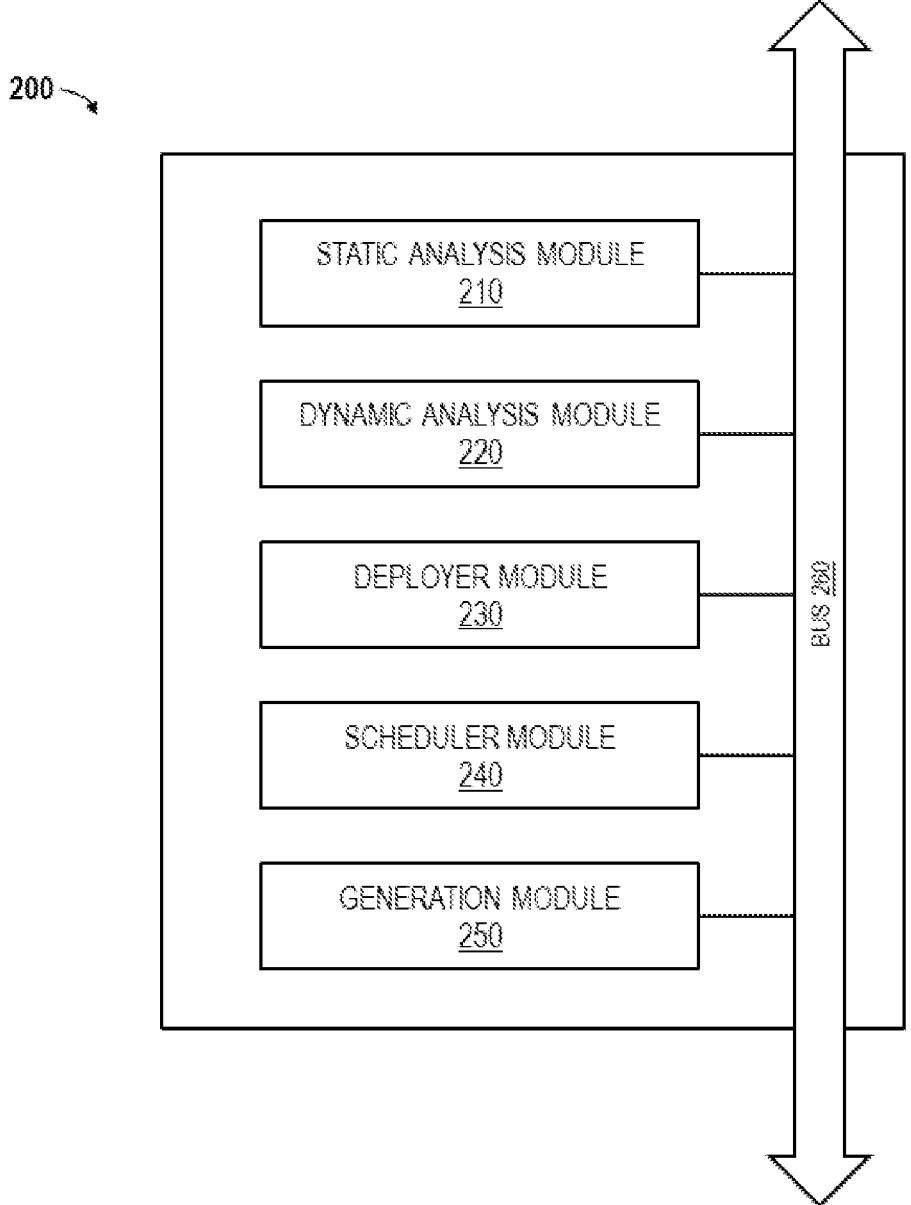
FIG. 2 shows a block diagram illustrating an exemplary service delivery system according to some embodiments of the present disclosure.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as service delivery system 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

It is understood that the computing environment 100 in FIG. 1 is only provided for illustration purpose without suggesting any limitation to any embodiment of this disclosure, for example, at least part of the program code involved in performing the inventive methods could be loaded in cache 121, volatile memory 112 or stored in other storage (e.g., storage 124) of the computer 101, or at least part of the program code involved in performing the inventive methods could be stored in other local or/and remote computing environment and be loaded when need. For another example, the peripheral device 114 could also be implemented by an independent peripheral device connected to the computer 101 through interface. For a further example, the WAN may be replaced and/or supplemented by any other connection made to an external computer (for example, through the Internet using an Internet Service Provider).

Generally, services may run in a plurality of phases before the services are officially put into use, for example, the development phase, the staging phase, and the production phase. Each of the phases may relate to a corresponding environment. A development environment is on a developer's computer. It's the environment for conducting all code development without touching the actual data. A staging environment is a production-like environment to check how the code will perform. This is the final testing ground before the code is pushed into production. In a production environment, systems go live, and the developed code can be released to users.

Embodiments of the present disclosure provide a service delivery system for delivering a plurality of services in an environment, for example, the staging environment or the production environment.

Based on the embodiments, a plurality of services can be deployed based on their dependency relationships, business priorities for each of the plurality of services, and deployment time for each of the plurality of services. A deployment failure of services due to ignoring the dependency relationships can be avoided. The service with higher business priority and/or more dependents can be deployed with higher priority. Multiple services without inter-dependency relationships can be deployed in parallel. Thus, a delivery efficiency of the services can also be improved greatly. A new version of services can be provided as early as possible.

Moreover, a plurality of services can be scheduled based on node affinity and their own service affinity during launch. It can improve system resource utilization. Meanwhile, the efficient scheduling process may save the system's effort to reschedule the services among nodes due to the shortage of system resource. Moreover, a visualization can be utilized to improve the scheduling efficiency and accuracy of the service.

With reference now to FIG. 2, a block diagram is provided illustrating an exemplary service delivery system 200 according to some embodiments of the present disclosure. The service delivery system 200 can be configured to deliver a plurality of services, such as cloud services, on-premises applications, and/or the like, in an environment, such as a staging environment or a production environment.

It should be noted that the processing of the service delivery system 200 according to embodiments of this disclosure could be implemented in the computing environment of FIG. 1.

As depicted in FIG. 2, the service delivery system 200 may comprise a static analysis module 210, a dynamic analysis module 220, a deployer module 230, a scheduler module 240, and a generation module 250. All, or some, of the modules may be configured to communicate with each other (e.g., via a bus 260, shared memory, a switch, or a network). Any one or more of these modules may be implemented using the processing circuitry 120 in FIG. 1

(e.g., by configuring the processing circuitry 120 to perform functions described for that module). It can be noted that, the addition, removal, and/or modification of one or more modules can be configured based on actual needs.

In some embodiments, the static analysis module 210 may perform a static analysis on the plurality of services to be deployed in an environment comprising a plurality of nodes, to determine dependency relationships among the plurality of services.

The dependency relationships may indicate sequences of at least some of the plurality of services. For example, the dependency relationships may indicate that a first service needs to be deployed after a second service has been deployed. In another word, the first service depends on the second service and is a dependent of the second service.

The static analysis module 210 may analyze source code for the respective services with a static code analysis tool, to determine service features/characteristics of the respective services. Thus, the dependency relationships may be determined based on the service features/characteristics. It is to be noted that, the static code analysis tool may be any suitable static code analysis tool known in the art. Moreover, the dependency relationships may also be determined based on, for example, an epic or ticket description, via project manager and releaser.

In some embodiments, the static analysis module 210 may perform the static analysis to further determine a static service affinity for a respective service in the plurality of services. For example, the static service affinity may also be determined based on the service features/characteristics of the respective service. For the respective service, the static service affinity may indicate an expected feature of resource usage associated with the service. For example, the expected feature may comprise CPU intensive, I/O intensive (e.g., disk I/O, network access I/O), mixed, and/or the like. As can be understood, the determination of static service affinity may be a qualitative analysis.

In an instance, the static analysis module 210 may analyze the source code for a service and determines that there may be a lot of file or database accesses, thus the corresponding static service affinity may be determined as I/O intensive. In another instance, the static analysis module 210 may analyze the source code for a service and determines that there may be a lot of network application programming interface (API) calls with respect to the service, then the corresponding static service affinity may be determined as I/O intensive. In yet another instance, the static analysis module 210 may analyze the source code for a service and determines that a lot of encryption/decryptions occur in the service, then the service may be determined as CPU intensive.

In some embodiments, the generation module 250 may generate a Directed Acyclic Diagram (DAG) associated with the plurality of services with their dependency relationships presented. For example, the generation module 250 may receive the analysis results for the services as described above from the static analysis module 210 and generate a DAG based on the analysis results. The generated DAG may be, for example, presented via a display (e.g., the UI device set 123 in FIG. 1). For example, the generated DAG may comprise a plurality of nodes, each representing a service in the plurality of services, and a plurality of edges connected between corresponding nodes and representing the dependency relationships. Moreover, the generated DAG may also include indicators associated with each service, to indicate, such as, the static service affinity.

Further, the generation module 250 may also generate other presentations for the plurality of services, such as, an adjacency list, an orthogonal list, and/or the like. With such presentations, users may be provided with vivid and real-time visualization regarding the services, thereby improving user experiences.

Figure 3:
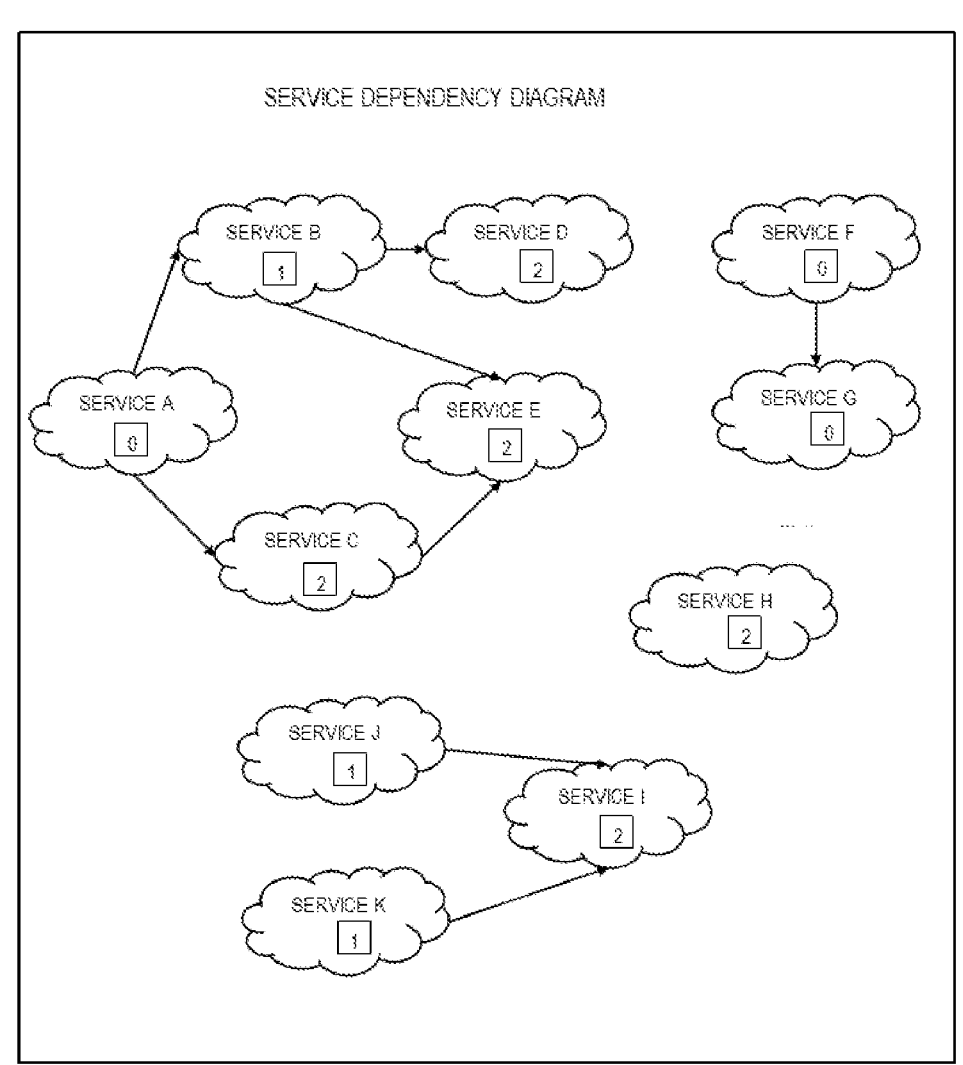
FIG. 3 shows an exemplary Directed Acyclic Diagram (DAG) illustrating dependency relationships of a plurality of services according to some embodiments of the present disclosure.

In an example, FIG. 3 depicts an exemplary DAG showing dependency relationships of a plurality of services according to some embodiments of the present disclosure. In FIG. 3, each node represents a service, e.g., SERVICE A, B, C, D, E, F, G, H, I, J, or K. Respective edges (i.e., arrow lines) represent the dependency relationships among the plurality of services. For example, the SERVICE D depends on SERVICE B, which depends on SERVICE A.

Moreover, the static service affinity for each service may be identified with an indicator, such as, 0 for CPU-intensive, 1 for I/O intensive, 2 for mixed. As depicted, the SERVICEs A, F, G may be classified as CPU intensive. The SERVICEs B, J and K may be classified as I/O intensive. The SERVICEs C, D, E, H, I may be classified as mixed.

Figure 4:
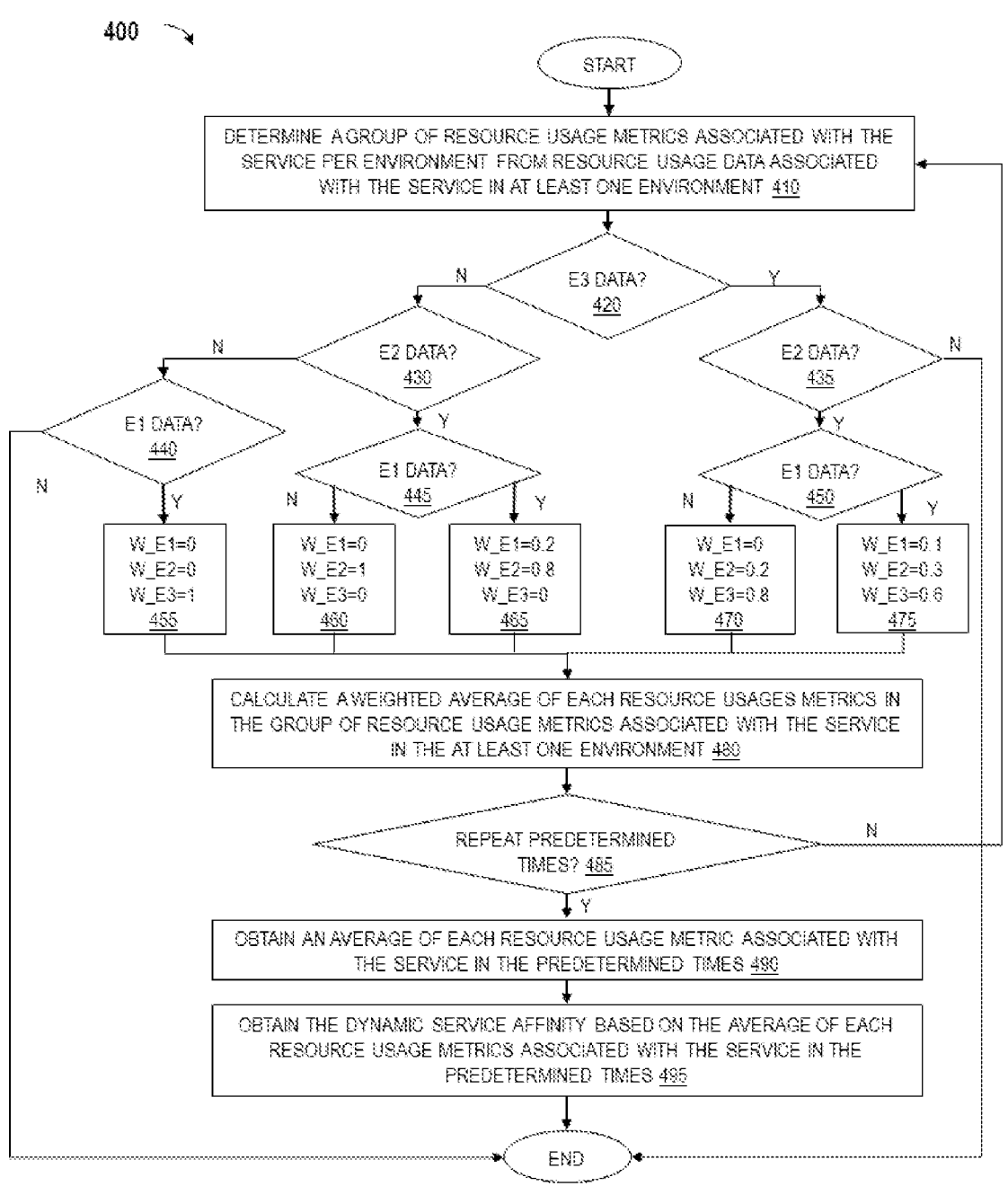
FIG. 4 shows a flowchart illustrating an exemplary dynamic analysis process of a service according to some embodiments of the present disclosure.

Back to FIG. 2, the dynamic analysis module 220 may perform a dynamic analysis on a service in the plurality of services to determine a dynamic service affinity of the service based on resource usage data associated with the service in at least one environment. FIG. 4 depicts a flowchart of an exemplary dynamic analysis process 400 of a service according to some embodiments of the present disclosure. Thus, description will be provided in combination with FIG. 4.

In some embodiments, the dynamic analysis module 220 may determine a group of resource usage metrics associated with the service per environment from resource usage data associated with the service in at least one environment at block 410.

Specifically, the dynamic analysis module 220 may collect the resource usage data associated with the service from each environment in at least one environment. As discussed above, the at least one environment may comprise a development environment, a staging environment, and/or a production environment. Generally, a monitor may be arranged in the respective environments, such that the dynamic analysis module 220 may receive the resource usage data from the monitor.

The dynamic analysis module 220 may determine the group of resource usage metrics associated with the service per environment from the resource usage data. For example, for each of the development environment, the staging environment and the production environment, the dynamic analysis module 220 may consolidate/aggregate the services' resources usage data, to obtain the group of resource usage metrics associated with the service in such environment. The group of resource usage metrics may comprise, for example, CPU usage, memory usage, cache usage, buffer usage, disk read times, disk write times, network send times, network receive times, and/or the like.

Then, the dynamic analysis module 220 may set a weight to the group of resource usage metrics associated with the service per environment based on the resource usage data. In an aspect, as resource usage data obtained from the development environment may be less accurate than that from the staging environment, the group of resource usage metrics from the development environment may be set with a lower weight than that from the staging environment. In another aspect, as resource usage data obtained from the staging environment may be less accurate than that from the production environment, the group of resource usage metrics from the staging environment may be set with a lower weight than that from the production environment. The weight setting process may be described in connection with blocks 420, 430, 435, 440, 445, 450, 455, 460, 465, 470, and 475 in FIG. 4 discussed below.

For example, as depicted in FIG. 4, the dynamic analysis module 220 may determine if the associated resource usage data from the production environment (identified as E3) is available at block 420. If it is unavailable, the process 400 goes to block 430 to check if the associated resource usage data from the staging environment (identified as E2) is available. If it is unavailable, the process 400 continues at block 440 to determine if the associated resource usage data from the development environment (identified as E1) is available. If available, the dynamic analysis module 220 may set weights to respective groups of resource usage metrics in respective environments at block 455, for example, 1 for the group from the development environment, and 0 for the group from other environments. In other words, in this situation, the dynamic analysis module 220 can only obtain the service's resource usage data in the development environment.

On the other hand, if the associated resource usage data in development environment is determined to be unavailable in block 440, the process 400 ends. That is, the dynamic analysis module 220 cannot obtain any resource usage data associated with the service.

In another example, back to block 430, if the associated resource usage data from the staging environment is available, the dynamic analysis module 220 may further determine whether the associated resource usage data from the development environment is available at block 445. If unavailable, the dynamic analysis module 220 may set the respective weights, for example, 1 for the group of resource usage metrics from staging environment, and 0 for the group of resource usage metrics from other environments, at block 460. In this situation, the dynamic analysis module 220 can only obtain the service's resource usage data in the staging environment.

Otherwise, if the associated resource usage data from the development environment is determined as available at block 445, the dynamic analysis module 220 may set the different weights at block 465, for example, 0.2 for the group of resource usage metrics from the development environment, 0.8 for the group of resource usage metrics from the staging environment, and 0 for the group of resource usage metrics from the production environment. In this situation, the dynamic analysis module 220 can only obtain the service's resource usage data in both the development environment and the staging environment.

Moreover, back to block 420, if the associated usage data from the production environment is available, the dynamic analysis module 220 may check if the associated usage data from the staging environment is available at block 435. If available, the dynamic analysis module 220 may further check if the associated usage data from the development environment is available at block 450. If unavailable, the dynamic analysis module 220 may set the respective weights for the respective group of resource usage metrics at block 470, for example, 0 for the group of resource usage metrics from the development environment, 0.2 for the group of resource usage metrics from the staging environment, and 0.8 for the group of resource usage metrics from the production environment. In this situation, the dynamic analysis module 220 can only obtain the service's resource usage data in both the staging environment and the production environment.

Otherwise, if the associated usage data from the development environment is determined as available at block 450, the dynamic analysis module 220 may set different weights at block 475, for example, 0.1 for the group of resource usage metrics from the development environment, 0.3 for the group of resource usage metrics from the staging environment, and 0.6 for the group of resource usage metrics from the production environment. In this situation, the dynamic analysis module 220 can obtain the service's resource usage data in all three environments.

Moreover, if the associated usage data from the staging environment is determined as unavailable at block 435, the process ends. That is, the dynamic analysis module 220 can obtain the service's resource usage data in the production environment but not in the staging environment, which may be unreliable data.

As can be noted, the above weight setting process and the set values of weights are only for illustrative purpose, other appropriate process and values can be provided based on actual needs.

After setting the weights, the dynamic analysis module 220 may further calculate a weighted average of each resource usages metrics in the group of resource usage metrics associated with the service in the at least one environment at block 480. In some embodiments, the dynamic analysis module 220 may calculate the weighted average of following metrics with the weight set for different environments, CPU usage, memory usage, cache usage, buffer usage, disk read times, disk write times, network send times, network receive times, and/or the like. For example, each weighted average of the metrics can be derived based on Equation 1.

$$X_w = \frac{\sum_{i=1}^{n} w_i X_i}{\sum_{i=1}^{n} w_i} \qquad \text{(Equation 1)}$$

In Equation 1, $X_i$ denotes the resource usage metric collected from the i-th environment, $w_i$ denotes a corresponding weight for the i-th environment, n denotes the number of the environments, and X, denotes weighted average of the resource usage metric.

In some embodiments, the dynamic analysis module 220 may repeat the above processes (e.g., the determining, setting, calculating steps) for predetermined times. For example, at block 485, the dynamic analysis module 220 may determine whether the process repeats the predetermined times. If not, the dynamic analysis process 400 may continue at block 410. For example, in a next cycle, updated resource usage data may be collected to determine the group of resource usage metrics associated with the service per environment. Then, the weights may be set again based on the updated resource usage data, such that the weighted average of each resource usage metric associated with the service may be calculated accordingly.

With the repeating times increasing, more usage resource data can be obtained, and the dynamic analysis result from the dynamic analysis module 220 could be more accurate.

After the above process repeats the predetermined times, the dynamic analysis module 220 may obtain an average of each resource usage metric associated with the service in the predetermined times, at block 490. For example, the average of each resource usage metric can be derived based on Equation 2.

$$\overline{X_w} = \frac{\sum_{i=1}^{m} X_{w_i}}{m} \qquad \text{(Equation 2)}$$

In Equation 2, $X_{w_i}$ denotes a weighted average of a metric, as calculated in Equation 1, in the i-th process, m denotes repeating times (or predetermined times), and $\overline{X_w}$ denotes an average of the metric.

Further, the dynamic analysis module 220 may obtain a standard deviation of the average of each resource usage metric to facilitate the dynamic analysis. For example, the standard deviation SD can be derived based on Equation 3.

$$SD = \sqrt{\frac{\sum_{i=1}^{m} |X_{w_i} - \overline{X_w}|^2}{m - 1}} \qquad \text{(Equation 3)}$$

It is to be noted, each element in Equation 3 can refer to Equation 2.

Therefore, the dynamic analysis module 220 may pull services' resource usage data from the respective environments periodically. With the lapse of time, the service may run in different phases. For example, during a first period, a service may only run in a development phase, thus resource usage data can only be obtained for the development environment. During a latter period, the service may run in a staging phase, thus resource usage data from both development environment and staging environment may be available. Thus, the weight for each group of metrics may be dynamically adjusted based on actual needs.

Accordingly, the dynamic analysis module 220 may obtain the dynamic service affinity based on the average of each resource usage metrics associated with the service in the predetermined times at block 495. Similar with the static service affinity, the dynamic service affinity may indicate a calculated feature of resource usage associated with the service. For example, the dynamic service affinity may comprise CPU intensive, I/O intensive (e.g., disk I/O, network access I/O), mixed, and/or the like. For example, in a case that CPU usage metric of a service is very high while memory usage metric is relatively low, the dynamic service affinity can be determined as CPU intensive. As can be understood, the determination of dynamic service affinity may be a quantitative analysis.

It is to be noted that the above method for determining the dynamic service affinity is only for illustrative. The skills in the art can understand that any other appropriate method for determining the dynamic service affinity can also be employed.

Figure 5A:
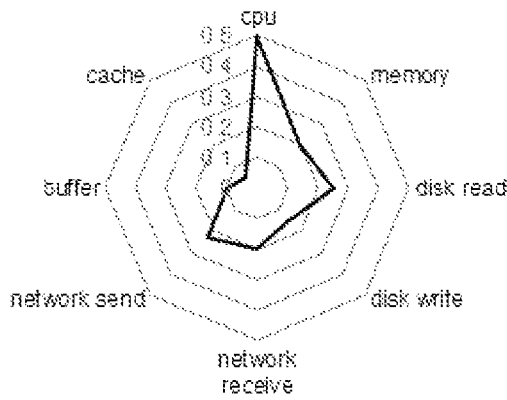
FIG. 5A shows an exemplary radar diagram illustrating resource usage metrics associated with a service according to some embodiments of the present disclosure.
Figure 5B:
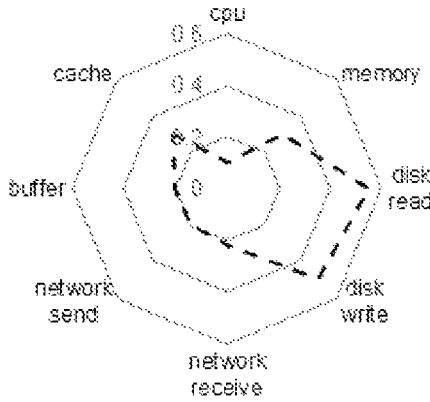
FIG. 5B shows an exemplary radar diagram illustrating resource usage metrics associated with a service according to some embodiments of the present disclosure.
Figure 5C:
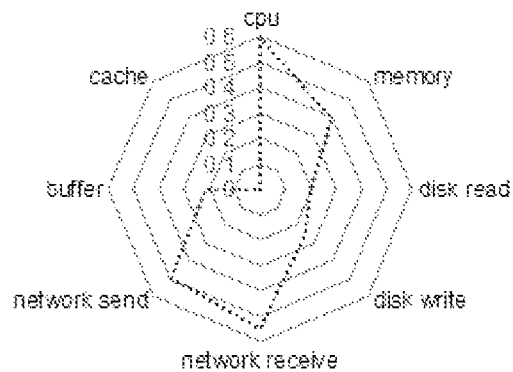
FIG. 5C shows an exemplary radar diagram illustrating resource usage metrics associated with a service according to some embodiments of the present disclosure.
Figure 5D:
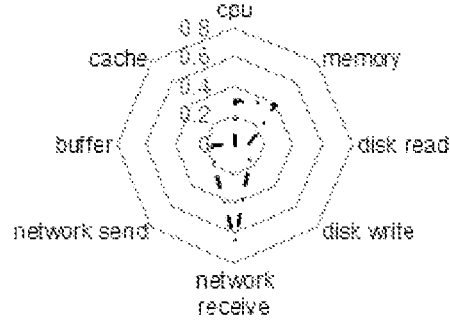
FIG. 5D shows an exemplary radar diagram illustrating resource usage metrics associated with a service according to some embodiments of the present disclosure.

In some embodiments, the generation module 250 may generate a presentation associated with the average of each resource usage metric associated with the service in the predetermined times. For example, the presentation may be a graph, e.g., a radar diagram. For example, FIG. 5A depicts an exemplary radar diagram showing a group of resource usage metrics associated with a service (SERVICE 510) in an embodiment. FIG. 5B depicts an exemplary radar diagram showing a group of resource usage metrics associated with a service (SERVICE 520) in an embodiment. FIG. 5C depicts an exemplary radar diagram showing a group of resource usage metrics associated with a service (SERVICE 530) in an embodiment. FIG. 5D depicts an exemplary radar diagram showing a group of resource usage metrics associated with a service (SERVICE 540) in an embodiment.

In some embodiments, the dynamic analysis module 220 may retrieve a plurality of sample presentations, for example, sample radar diagrams. Each sample presentation may be associated with a sample service. For example, the sample presentation may comprise a CPU intensive service graph, a I/O intensive service graph, a mixed service graph, and/or the like. Then, the dynamic analysis module 220 may match the generated presentation with the sample presentations to obtain the corresponding dynamic service affinity of the service, for example, via graphic matching.

As examples in FIGS. 5A-5D, the SERVICE 510 may be determined as CPU intensive. The SERVICEs 520 and 540 may be determined as I/O intensive. The SERVICE 530 may be determined as mixed.

Returning to FIG. 2, in some embodiments, the deployer module 230 may deploy the plurality of services in the environment based on the dependency relationships, a predefined priority for each of the plurality of services and a deployment time for each of the plurality of services. The environment may be a staging environment or a production environment. In some embodiments, the predefined priority of a service may be a business priority of the service which can be specified based on actual needs, for example, by a developer.

In an instance, the deployer module 230 may calculate a respective score for a respective service in the plurality of services. In some embodiments, the respective score can be obtained based on a respective predefined priority for the respective service, a dependency factor for the respective service, and scores of other services depending on the respective service. The dependency factor may be based on the dependency relationships.

Figure 6:
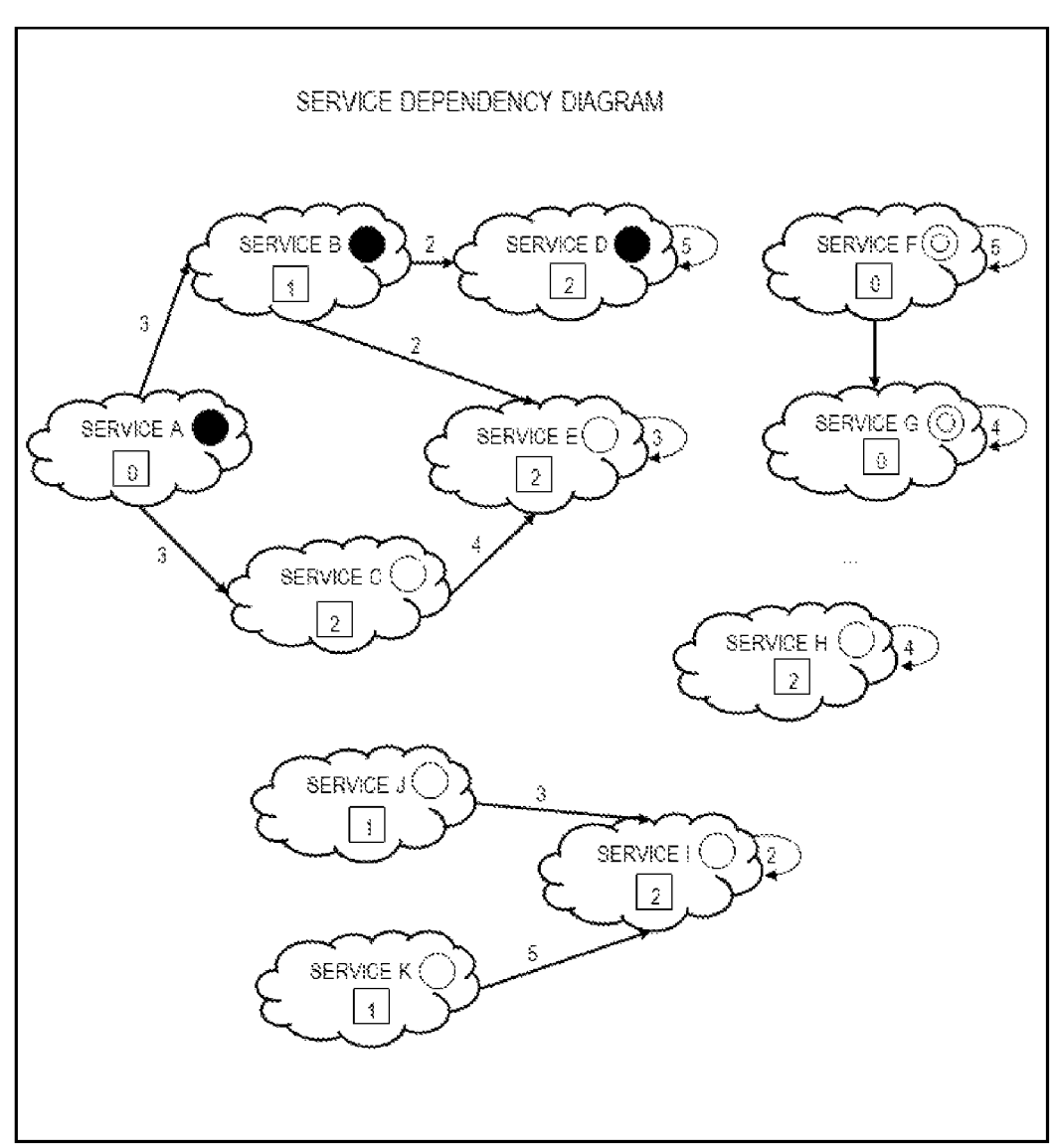
FIG. 6 shows an exemplary DAG illustrating dependencies of a plurality of services according to some embodiments of the present disclosure.

As discussed above, the dependency relationships of the services may be presented via a DAG, for example, the DAG as shown in FIG. 3. FIG. 6 depicts an exemplary DAG (for example, the DAG in FIG. 3) illustrating dependencies of a plurality of services, in which the predefined priority can be identified with different kinds of indicators. For example, the SERVICEs A, B, and D are respectively identified with a solid circle representing a higher business priority. The SERVICEs F and G are respectively identified with a double circle representing a medium business priority. The SERVICEs C, E, I, J and K are respectively identified with a hollow circle representing a lower business priority.

In an example, the deployer module 230 may calculate the respective score for the respective service based on the following algorithm.

Score Algorithm:

$$C_j = \sum_{i=0}^{n} C_i + p_j * d_j {}^\wedge k$$

$$(n \geq 0, k \geq 0)$$

$C_j$: the score of service j.

$C_i$: the score of service i. The service i is directly or indirectly depending on the service j, and can be referred to as a dependent of the service j.

n: number of the services (or dependents) depending, directly or indirectly, on the service j.

$p_j$: the predetermined priority of service j.

$d_j{}^\wedge k$: the dependency factor of service j, e.g., $2^k$. k is a dependency depth of the service j, for example, the maximum number of dependents in a dependency path of the service j.

Therefore, if n=0, then $$C_j = p_j * d_j^k = p_j.$$

Otherwise, if n>0, then $$C_j = \sum_{i=0}^{n} c_i + p_j * d_j {}^\wedge k$$

Accordingly, a service with higher score (for example, due to higher business priority and/or more dependents) may be deployed with higher priority.

It is to be noted that, the above calculation method of the score of service is only for illustrative purposes. The score of service can also be calculated by some other appropriate method based on a respective predefined priority for the respective service, dependency relationships, and/or the like.

In some embodiments, the deployer module 230 may deploy the plurality of services based on the calculated respective scores and deployment time for each of the plurality of services. For example, the deployer module 230 may calculate the deployment time of a service based on an image size of the service and a network speed. For example, (deployment time)=(image size of service)/(network speed).

The deployer module 230 may further define the deployment time as the weight of edge (e.g., arrow line) in DAG. As depicted in FIG. 6, each of the plurality of services can be identified with the corresponding weight (deployment time of the service).

In some embodiments, the deployer module 230 may deploy two or more services of the plurality of services without inter-dependency in parallel.

Figure 7:
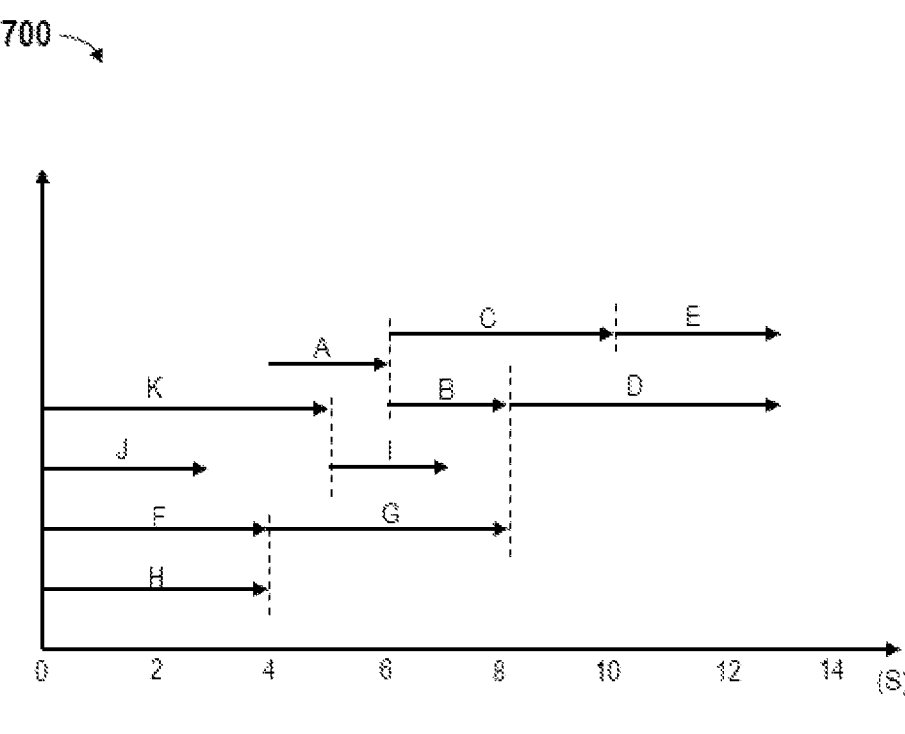
FIG. 7 shows a timing diagram illustrating an exemplary process of deploying a plurality of services according to some embodiments of the present disclosure.

In an aspect, the deployer module 230 may deploy the plurality of services only based on the deployment time of the respective services. FIG. 7 depicts a timing diagram of an exemplary process of deploying a plurality of services (for example, the services as shown in FIG. 6) according to some embodiments. As depicted, the service deployment sequence may be presented as the SERVICEs (H, F, J, K)->the SERVICEs (G, A, I)->the SERVICEs (C, B)->the SERVICEs (D, E). A maximum number of 4 services can be deployed simultaneously. In other words, a parallel degree in this case is 4. As shown in FIG. 7, a length of each arrow line may indicate a deployment time for a corresponding service. In this embodiment, the latest deployed services are D and E, which are deployed during the 13th second.

Figure 8:
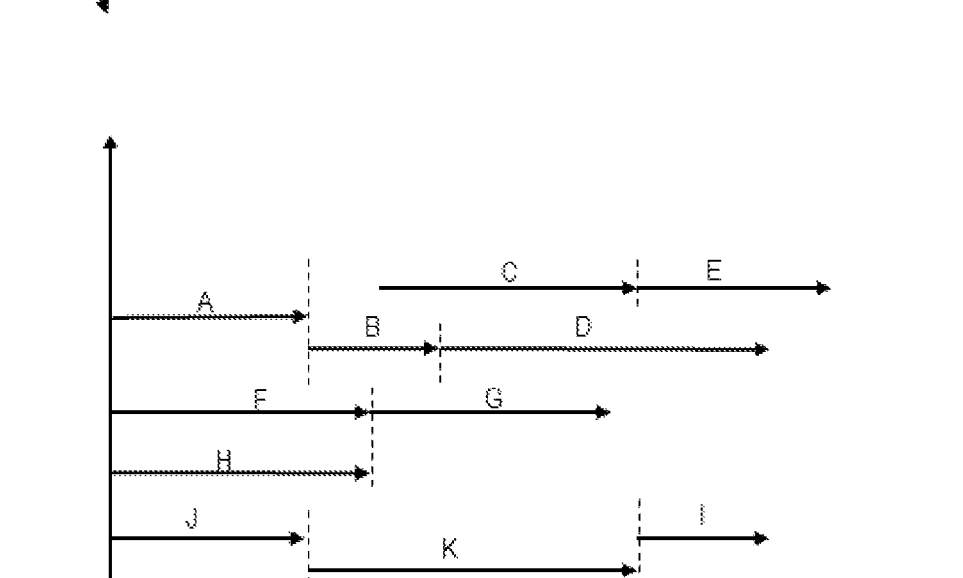
FIG. 8 shows a timing diagram illustrating an exemplary process of deploying a plurality of services according to some embodiments of the present disclosure.

In another aspect, the deployer module 230 may also deploy the plurality of services based on both the calculated respective scores and the deployment time of the respective services. FIG. 8 depicts a timing diagram of an exemplary process of deploying a plurality of services (for example, the services as shown in FIG. 6) according to some embodiments. The parallel degree is also 4. As shown in FIG. 8, the service deployment sequence may be presented as the SERVICEs (A, F, H, J)->the SERVICEs (B, K, G)->the SERVICEs (C, D)->the SERVICEs (I, E). The latest deployed service is E, which is deployed during the 11th second.

Therefore, the deploying process considering the calculated scores and the respective deployment time may be more efficient (or, faster) than the deploying process considering only the respective deployment time.

Returning to FIG. 2, the scheduler module 240 may schedule respective services into corresponding nodes in the environment.

In some embodiments, the scheduler module 240 may receive a dynamic service affinity of a service from the dynamic analysis module 220. Thus, the scheduler module 240 may schedule the service based on the dynamic service affinity of the service and a node affinity of a respective node in the plurality of nodes.

In some embodiments, the scheduler module 240 may obtain first resource usage data associated with one or more services to be scheduled, for example, from the dynamic analysis module 220. The scheduler module 240 may determine a candidate node in the plurality of nodes based on the node affinity of the respective node. The scheduler module 240 may also receive second resource usage data associated with all running services on the candidate node, for example, from the dynamic analysis module 220. Then, the scheduler module 240 may combine the first resource usage data and the second resource usage data to determine a combined result. If the combined result meets certain rules, the scheduler module 240 may schedule the one or more services to be scheduled into the candidate node. Otherwise, the scheduler module 240 may search for another candidate node to repeat the above receiving and combining steps.

Figure 9A:
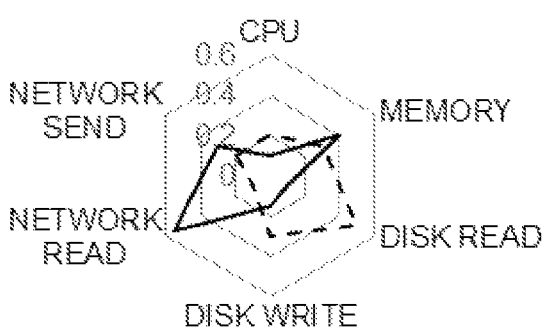
FIG. 9A shows an exemplary radar diagram illustrating resource usage metrics associated with services to be scheduled according to some embodiments of the present disclosure.

In some embodiments, the first resource usage data comprises one or more groups of resource usage metrics associated with the one or more services to be scheduled. In some embodiments, each group of resource usage metrics may be determined based on a dynamic analysis process according to embodiments of the present disclosure, for example, in combination with FIG. 4. For example, each group of resource usage metrics may comprise the average of each resource usage metric associated with the corresponding service to be scheduled in predetermined times. FIG. 9A depicts an exemplary radar diagram showing resource usage metrics associated with services S1 and S2 to be scheduled in some embodiments.

Further, the node affinity may indicate a resource feature of a node. For example, if a service is expected to be operated with 2 CPUs and 8G memory, the scheduler module 240 may determine a candidate (or target) node of the plurality of nodes with two or more CPUs and at least 8G memory. In another example, if a service requires specific computing capability, for example, graphic processing function, a candidate (or target) node would be determined to have the specific computing capability, like GPU. Therefore, the scheduler module 240 may determine the candidate node based on the corresponding node affinity.

Figure 9B:
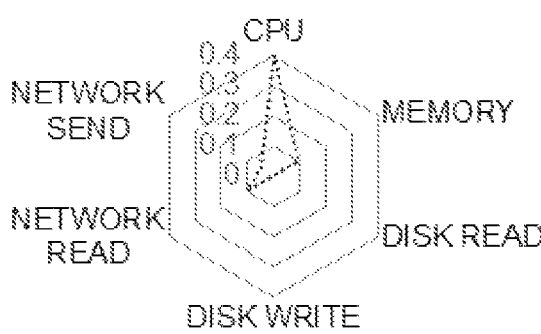
FIG. 9B shows an exemplary radar diagram illustrating resource usage metrics associated with a running service on a candidate node according to some embodiments of the present disclosure.

In some embodiments, the second resource usage data comprises one or more groups of resource usage metrics associated with all running services on the candidate node. In some embodiments, each group of resource usage metrics may be determined based on a dynamic analysis process according to embodiments of the present disclosure, for example, in combination with FIG. 4. For example, each group of resource usage metrics may comprise the average of each resource usage metric associated with the corresponding service running on the candidate node in predetermined times. FIG. 9B depicts an exemplary radar diagram showing resource usage metrics associated with a service S3 which is running on the candidate node in some embodiments.

Moreover, the scheduler module 240 may generate a combined presentation associated with a group of combined metrics by combining the one or more groups of resource usage metrics associated with the one or more services to be scheduled with the one or more groups of resource usage metrics associated with the running services on the candidate node. Then, the scheduler module 240 may determine whether the combined presentation meets certain graphic rules.

As an example, the scheduler module 240 may combine the radar diagram in FIG. 9A and the radar diagram in FIG. 9B to generate a radar diagram of combined resource usage metrics associated with all of the services Si, S2, and S3.

Figure 9C:
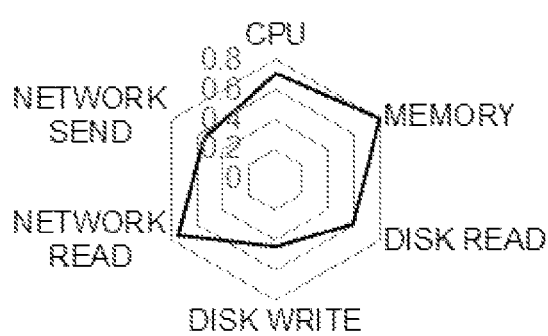
FIG. 9C shows an exemplary radar diagram illustrating combined resource usage metrics associated with combined services according to some embodiments of the present disclosure.

FIG. 9C depicts the combined radar diagram based on FIGS. 9A and 9B in some embodiments. It can be understood that the combined radar diagram may represent expected resource usages when the services S1 and S2 are scheduled into the candidate node.

Moreover, for example, the graphic rules may comprise each resource usage metric being less than a threshold (e.g., 75%) of the corresponding resource of a node. Thus, the scheduler module 240 may automatically schedule the respective services based on the combined presentation and the node affinity.

As can be understood, if the combined presentation shows area of the radar diagram close to circle area, the scheduling to be performed may provide a good performance with the node's resource usage adequately utilized.

Moreover, in some embodiments, the scheduler module 240 may receive a static service affinity of a service from the static analysis module 210. Thus, the scheduler module 240 may schedule the service based on the static service affinity of the service, the dynamic service affinity of the service, and a node affinity of a respective node in the plurality of nodes.

Specifically, the scheduler module 240 may determine a combined service affinity (or referred to as service affinity) of a service based on the static service affinity and the dynamic service affinity of the service. The combined service affinity may be more reliable as it combines both the qualitative and quantitative analysis.

As an example, the scheduler module 240 may determine whether the static service affinity matches with the dynamic service affinity. For example, if both of the static service affinity and the dynamic service affinity indicate the service is CPU intensive, the scheduler module 240 may determine the combined service affinity is CPU intensive.

Otherwise, if the static service affinity does not match the dynamic service affinity, the scheduler module 240 may determine the combined service affinity based on actual settings. For example, if the static service affinity indicates the service is CPU intensive while the dynamic service affinity indicates the service is memory intensive, the scheduler module 240 may determine the service is mixed type. In another example, the combined service affinity may be determined based on specified weights assigned to the static service affinity and the dynamic service affinity. For example, if the dynamic service affinity is assigned with a higher weight than the static service affinity, in the above case, the scheduler module 240 may determine the service is memory intensive.

Further, the scheduler module 240 may work with the generation module 250 to update the service affinity identifier in the generated DAG, for example, the DAGs in FIG. 3 and FIG. 6. Specifically, the static service affinity in the respective identifiers may be replaced with the combined service affinity (or the dynamic service affinity) in FIG. 3 and FIG. 6.

In such case, the schedule module 240 may determine whether the candidate node is a suitable node for scheduling based on the service affinity of the running services and the service affinity of the service to be scheduled. For example, if the service to be scheduled into a candidate node is CPU intensive, while the running service on the candidate node is I/O intensive, resource conflicts may be unlikely to occur. Thus, the candidate node can be an appropriate node for scheduling. Then, the scheduler module 240 may schedule the service into the candidate node. Otherwise, the scheduler module 240 may find a next candidate node and perform the above processes until the suitable candidate node is found.

Figure 10:
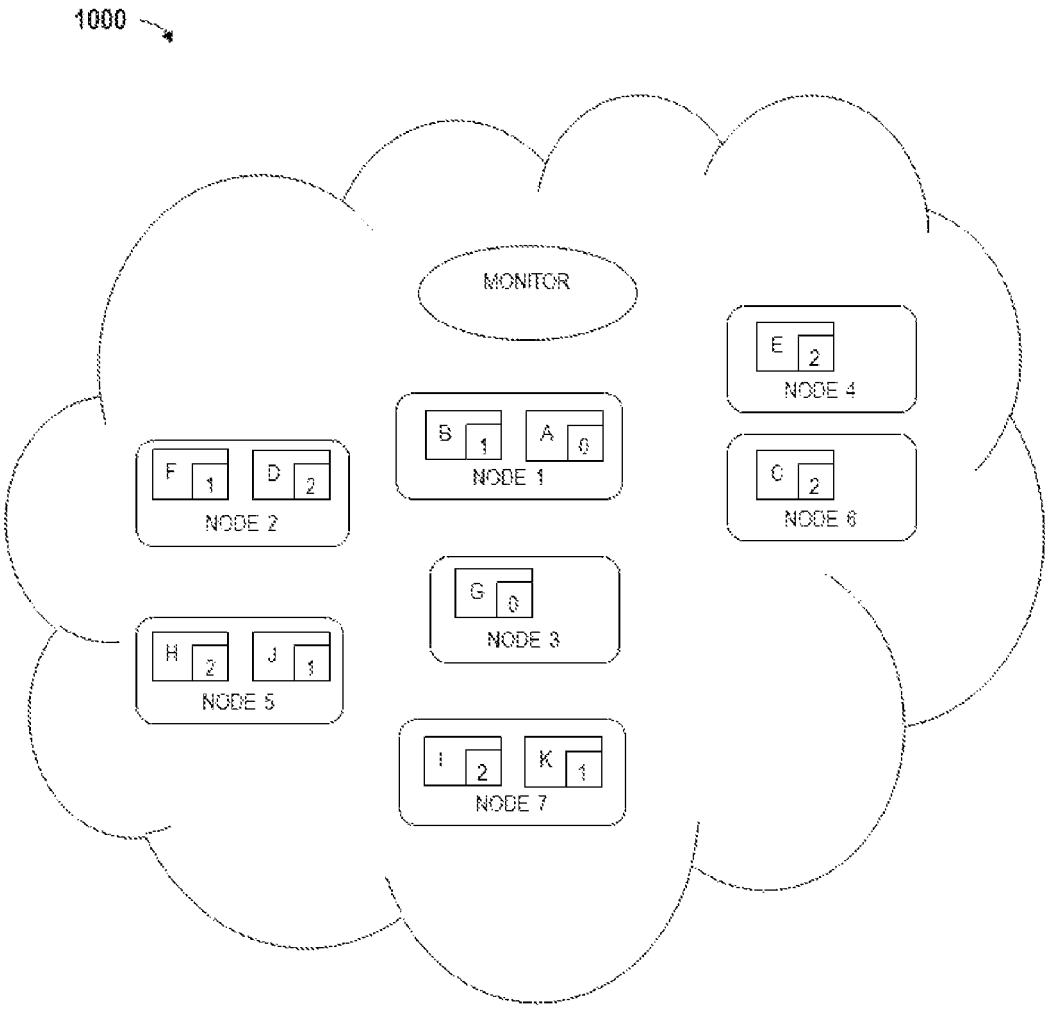
FIG. 10 shows a diagram of an exemplary environment comprising a plurality of nodes according to some embodiments of the present disclosure.

FIG. 10 depicts a diagram showing an exemplary environment comprising a plurality of nodes according to some embodiments. The services in FIG. 3 or 6 may be scheduled on the respective nodes in the environment 1000. The environment 1000 may be a staging environment or a production environment. There is a monitor arranged in the environment 1000 to monitor resource usage associated with the respective services, so as to provide resource usage data associated with the respective services.

As depicted, based on the combined result, the SERVICEs A and B can be scheduled into a node 1, as the SERVICE A is CPU intensive and the SERVICE B is I/O intensive. For other nodes, similarly, the SERVICEs F and D can be scheduled into a node 2, the SERVICE G can be scheduled into a node 3, the SERVICE E can be scheduled into a node 4, the SERVICEs H and J can be scheduled into a node 5, the SERVICE C can be scheduled into a node 6, and the SERVICEs I and K can be scheduled into a node 7.

FIG. 11 depicts a flowchart depicting the method for delivering services according to some embodiments of the present disclosure. The processing can be implemented by a computing device, such as a computer 101 shown in FIG. 1.

At block 1110, the computing device may perform a static analysis on a plurality of services to be deployed in an environment comprising a plurality of nodes, to determine dependency relationships among the plurality of services.

In some embodiments, the computing device may generate a directed acyclic diagram (DAG) associated with the plurality of services with their dependency relationships presented. The DAG comprises a plurality of nodes, each node representing a service, and a plurality of edges, each edge representing a dependency relationship. The edge may be assigned with a weight corresponding to a deployment time of an associated service.

In some embodiments, the computing device may perform a static analysis on a service in a plurality of services to be deployed in an environment comprising a plurality of nodes, to determine a static service affinity for the service.

Moreover, the computing device may perform a dynamic analysis on the service in the plurality of services to determine a dynamic service affinity of the service based on resource usage data associated with the service in at least one environment.

In some embodiments, for the service in the plurality of services, the computing device may implement the following steps. The computing device may determine a group of resource usage metrics associated with the service per environment from resource usage data associated with the service in at least one environment. The computing device may set a weight to the group of resource usage metrics associated with the service per environment based on the resource usage data. The computing device may calculate a weighted average of each resource usage metric in the group of resource usage metrics associated with the service in the at least one environment. The computing device may repeat the above determining, setting, and calculating steps for predetermined times. Then, the computing device may obtain an average of each resource usage metric associated with the service in the predetermined times, and obtain the dynamic service affinity based on the average of each resource usage metric associated with the service in the predetermined times.

In some further embodiments, the computing device may generate a presentation associated with the average of each resource usage metric associated with the service in the predetermined times. The computing device may also retrieve a plurality of sample presentations, each being associated with a sample service. Thus, the dynamic service affinity may be obtained by matching the generated presentation with the plurality of sample presentations.

At block 1120, the computing device may deploy the plurality of services in the environment based on the dependency relationships, a predefined priority for each of the plurality of services and deployment time for each of the plurality of services.

In some embodiments, the computing device may calculate a respective score for a respective service in the plurality of services. The respective score may be obtained based on a respective predefined priority for the respective service, a dependency factor for the respective service, and scores of other services depending on the respective service, wherein the dependency factor is based on the dependency relationships. The computing device may then deploy the plurality of services based on the calculated respective scores and deployment time for each of the plurality of services.

In some embodiments, two or more services of the plurality of services without inter-dependency can be deployed in parallel.

At block 1130, the computing device may schedule respective services into corresponding nodes in the environment.

In some embodiments, the computing device may schedule respective services into corresponding nodes in the environment, for example, based on the dynamic service affinity of the service and a node affinity of a respective node in the plurality of nodes.

In some embodiments, the computing device may obtain first resource usage data associated with one or more services to be scheduled. The computing device may determine a candidate node in the plurality of nodes based on the node affinity of the respective node. The computing device may receive second resource usage data associated with all running services on the candidate node. The computing device may combine the first resource usage data and the second resource usage data to determine a combined result. If the combined result meets certain rules, the computing device may schedule the one or more services to be scheduled into the candidate node. Otherwise, if the combined result does not meet the certain rules, the computing device may determine a next candidate node and repeating the receiving and combing steps.

In further embodiments, the first resource usage data may comprise one or more groups of resource usage metrics associated with the one or more services to be scheduled. The second resource usage data may comprise one or more groups of resource usage metrics associated with the running services on the candidate node. The computing device may generate a combined presentation associated with a group of combined metrics by combining the one or more groups of resource usage metrics associated with the one or more services to be scheduled with the one or more groups of resource usage metrics associated with the running services on the candidate node. Then, the computing device may determine whether the combined presentation meets certain graphic rules.

In further embodiments, the service may be scheduled further based on the static service affinity of the service.

Therefore, cloud services and on-premises applications can be deployed based on their dependencies, business priorities and deployment time for each of the plurality of services. The failure of application/service due to ignoring dependencies can be avoided. Application/services without inter-dependency can be deployed in parallel. The efficiency of applications/services delivery can be improved greatly. Thus, new version of services can be provided as early as possible.

Moreover, applications/services can be scheduled based on node affinity and their own service affinity during launch. It can improve the system resource utilizes. Meanwhile, the scheduling process may save the system's effort to reschedule the applications/services among nodes due to the shortage of system resource.

It can be noted that, the sequence of the blocks described in the above embodiments are merely for illustrative purposes. Any other appropriate sequences (including addition, deletion, and/or modification of at least one block) can also be implemented to realize the corresponding embodiments.

Additionally, in some embodiments of the present disclosure, a system for service delivery may be provided. The system may comprise one or more processors, a memory coupled to at least one of the one or more processors, and a set of computer program instructions stored in the memory. The set of computer program instructions may be executed by at least one of one or more processors to perform the above method.

In some other embodiments of the present disclosure, a computer program product for service delivery may be provided. The computer program product may comprise a computer readable storage medium having program instructions embodied therewith. The program instructions executable by one or more processors causes the one or more processors to perform the above method.

The present invention may be a system, a method, and/or a computer program product at any possible technical detail level of integration. The computer program product may include a computer readable storage medium (or media) having computer readable program instructions thereon for causing a processor to carry out aspects of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:

performing, by one or more processors, a static analysis on a plurality of services to be deployed in one or more environments comprising a plurality of nodes, to determine dependency relationships among the plurality of services;

deploying, by one or more processors, the plurality of services in the one or more environments based on the dependency relationships, a predefined priority for each of the plurality of services, and deployment time for each of the plurality of services;

performing, by one or more processors, a dynamic analysis on at least one service in the plurality of services to determine a dynamic service affinity of the at least one service based on resource usage data associated with the at least one service in the one or more environments, wherein performing the dynamic analysis comprises:

determining a group of resource usage metrics associated with the at least one service for each of the one or more environments based on the resource usage data associated with the at least one service in the one or more environments, setting a weight to the group of resource usage metrics associated with the at least one service for each of the one or more environments based on the resource usage data, calculating a weighted average of each resource usage metric in the group of resource usage metrics associated with the at least one service in the one or more environments, and obtaining the dynamic service affinity of the at least one service based on the weighted average of each resource usage metric associated with the at least one service; and scheduling, by one or more processors, the plurality of services into corresponding ones of the plurality of nodes in the one or more environments based at least in part on the dynamic service affinity of each service and a node affinity of a respective node in the plurality of nodes.

2. The computer-implemented method according to claim 1, wherein deploying the plurality of services in the one or more environments based on the dependency relationships, the predefined priority for each of the plurality of services, and deployment time for each of the plurality of services comprises:

calculating, by one or more processors, a respective score for a respective service in the plurality of services, wherein the respective score is obtained based on a respective predefined priority for the respective service, a dependency factor for the respective service, and scores of other services depending on the respective service, wherein the dependency factor is based on the dependency relationships; and deploying, by one or more processors, the plurality of services based on the calculated respective scores and deployment time for each of the plurality of services.

3. The computer-implemented method according to claim 1, wherein the static analysis is performed to further determine a static service affinity of the at least one service in the plurality of services; and wherein the at least one service is scheduled further based at least in part on the static service affinity of the at least one service.

4. The computer-implemented method according to claim 1, wherein performing the dynamic analysis on the at least one service in the plurality of services to determine the dynamic service affinity of the at least one service based on the resource usage data associated with the at least one service in the one or more environments comprises:

iteratively performing, by one or more processors, the determining, setting, and calculating steps for predetermined times; and obtaining, by one or more processors, an average of each resource usage metric associated with the at least one service in the predetermined times, and wherein the dynamic service affinity of the at least one service is obtained further based on the average of each resource usage metric associated with the at least one service in the predetermined times.

5. The computer-implemented method according to claim 4, further comprising:

generating, by one or more processors, a presentation associated with the average of each resource usage metric associated with the at least one service in the predetermined times; and retrieving, by one or more processors, a plurality of sample presentations, each being associated with a sample service;

wherein the dynamic service affinity of the at least one service is obtained by matching the generated presentation with the plurality of sample presentations.

6. The computer-implemented method according to claim 1, wherein scheduling the plurality of services into corresponding ones of the plurality of nodes in the one or more environments comprises:

obtaining, by one or more processors, first resource usage data associated with the plurality of services to be scheduled;

determining, by one or more processors, a candidate node in the plurality of nodes based on the node affinity of the respective node;

receiving, by one or more processors, second resource usage data associated with all running services on the candidate node;

combining, by one or more processors, the first resource usage data and the second resource usage data to determine a combined result; and scheduling, by one or more processors, the plurality of services to be scheduled into the candidate node in response to the combined result meeting certain rules.

7. The computer-implemented method according to claim 6, wherein the first resource usage data comprises one or more groups of resource usage metrics associated with the plurality of services to be scheduled, and the second resource usage data comprises one or more groups of resource usage metrics associated with the running services on the candidate node; and wherein combining the first resource usage data and the second resource usage data to determine the combined result comprises:

generating, by one or more processors, a combined presentation associated with a group of combined metrics by combining the one or more groups of resource usage metrics associated with the plurality of services to be scheduled with the one or more groups of resource usage metrics associated with the running services on the candidate node; and determining, by one or more processors, whether the combined presentation meets certain graphic rules.

8. The computer-implemented method according to claim 1, wherein two or more services of the plurality of services without inter-dependency are deployed in parallel.

9. The computer-implemented method according to claim 1, wherein performing the static analysis of the plurality of services comprises:

generating, by one or more processors, a Directed Acyclic Diagram (DAG) representing the plurality of services, wherein the DAG comprises:

a plurality of nodes, each node corresponding to a respective service in the plurality of services; and a plurality of edges, each edge connecting two corresponding nodes of the plurality of nodes, the plurality of edges representing the dependency relationships among the plurality of services.

10. The computer-implemented method according to claim 9, wherein the DAG comprises one or more indicators corresponding to each service, the one or more indicators including at least a static service affinity indicator.

11. The computer-implemented method according to claim 10, wherein the static service affinity indicator comprises at least one of a CPU-intensive type, an I/O-intensive type, or a combination thereof.

12. A system, comprising:

one or more processors;

a memory coupled to at least one of the processors; and a set of computer program instructions stored in the memory and executed by at least one of the one or more processors in order to perform actions of:

performing a static analysis on a plurality of services to be deployed in one or more environments comprising a plurality of nodes, to determine dependency relationships among the plurality of services;

deploying the plurality of services in the one or more environments based on the dependency relationships, a predefined priority for each of the plurality of services and deployment time for each of the plurality of services;

performing a dynamic analysis on at least one service in the plurality of services to determine a dynamic service affinity of the at least one service based on resource usage data associated with the at least one service in the one or more environments, wherein performing the dynamic analysis comprises:

determining a group of resource usage metrics associated with the at least one service for each of the one or more environments based on the resource usage data associated with the at least one service in the one or more environments, setting a weight to the group of resource usage metrics associated with the at least one service for each of the one or more environments based on the resource usage data, calculating a weighted average of each resource usage metric in the group of resource usage metrics associated with the at least one service in the one or more environments, and obtaining the dynamic service affinity of the at least one service based on the weighted average of each resource usage metric associated with the at least one service; and scheduling the plurality of services into corresponding nodes of the plurality of nodes in the one or more environments based at least in part on the dynamic service affinity of each service and a node affinity of a respective node in the plurality of nodes.

13. The system according to claim 12, wherein deploying the plurality of services in the one or more environments based on the dependency relationships, the predefined priority for each of the plurality of services, and deployment time for each of the plurality of services comprises:

calculating a respective score for a respective service in the plurality of services, wherein the respective score is obtained based on a respective predefined priority for the respective service, a dependency factor for the respective service, and scores of other services depending on the respective service, wherein the dependency factor is based on the dependency relationships; and deploying the plurality of services based on the calculated respective scores and deployment time for each of the plurality of services.

14. The system according to claim 12, wherein the static analysis is performed to further determine a static service affinity of the at least one service; and wherein the at least one service is scheduled further based at least in part on the static service affinity of the at least one service.

15. The system according to claim 12, wherein performing the dynamic analysis on the at least one service in the plurality of services to determine the dynamic service affinity of the at least one service based on the resource usage data associated with the at least one service in the one or more environments comprises:

iteratively performing the determining, setting, and calculating steps for predetermined times; and obtaining an average of each resource usage metric associated with the at least one service in the predetermined times, and wherein the dynamic service affinity of the at least one service is further obtained based on the average of each resource usage metric associated with the at least one service in the predetermined times.

16. The system according to claim 12, wherein scheduling the plurality of services into corresponding nodes of the plurality of nodes in the one or more environments comprises:

obtaining first resource usage data associated with the plurality of services to be scheduled;

determining a candidate node in the plurality of nodes based on the node affinity of the respective node;

receiving second resource usage data associated with all running services on the candidate node;

combining the first resource usage data and the second resource usage data to determine a combined result; and scheduling the plurality of services to be scheduled into the candidate node in response to the combined result meeting certain rules.

17. A computer program product, comprising a computer readable storage medium having program instructions embodied therewith, the program instructions executable by-a one or more processors to cause the one or more processors to perform actions of:

performing a static analysis on a plurality of services to be deployed in one or more environments comprising a plurality of nodes, to determine dependency relationships among the plurality of services;

deploying the plurality of services in the one or more environments based on the dependency relationships, a predefined priority for each of the plurality of services and deployment time for each of the plurality of services;

performing a dynamic analysis on at least one service in the plurality of services to determine a dynamic service affinity of the at least one service based on resource usage data associated with the at least one service in the one or more environments, wherein performing the dynamic analysis comprises:

determining a group of resource usage metrics associated with the at least one service for each of the one or more environments based on the resource usage data associated with the at least one service in the one or more environments, setting a weight to the group of resource usage metrics associated with the at least one service for each of the one or more environments based on the resource usage data, calculating a weighted average of each resource usage metric in the group of resource usage metrics associated with the at least one service in the one or more environments, and obtaining the dynamic service affinity of the at least one service based on the weighted average of each resource usage metric associated with the at least one service; and scheduling the plurality of services into corresponding ones of the plurality of nodes in the one or more environments based at least in part on the dynamic service affinity of each service and a node affinity of a respective node in the plurality of nodes.

18. The computer program product according to claim 17, wherein deploying the plurality of services in the one or more environments based on the dependency relationships, the predefined priority for each of the plurality of services, and deployment time for each of the plurality of services comprises:

calculating a respective score for a respective service in the plurality of services, wherein the respective score is obtained based on a respective predefined priority for the respective service, a dependency factor for the respective service, and scores of other services depending on the respective service, wherein the dependency factor is based on the dependency relationships; and deploying the plurality of services based on the calculated respective scores and deployment time for each of the plurality of services.

19. The computer program product according to claim 17, wherein the static analysis is performed to further determine a static service affinity of the at least one service; and wherein the at least one service is scheduled further based at least in part on the static service affinity of the service.

20. The computer program product according to claim 17, wherein performing the dynamic analysis on the at least one service in the plurality of services to determine the dynamic service affinity of the at least one service based on the resource usage data associated with the at least one service in the one or more environments comprises:

iteratively performing the determining, setting, and calculating steps for predetermined times; and obtaining an average of each resource usage metric associated with the at least one service in the predetermined times, and wherein the dynamic service affinity of the at least one service is further obtained based on the average of each resource usage metric associated with the at least one service in the predetermined times.

* * * * *